United States Patent
Zhang

(10) Patent No.: US 9,392,453 B2
(45) Date of Patent: Jul. 12, 2016

(54) AUTHENTICATION

(75) Inventor: Ning Zhang, Xi An (CN)

(73) Assignee: Lantiq Beteiligungs-GmbH & Co.KG, Neubiberg (DE)

( * ) Notice: Subject to any disclaimer, the term of this patent is extended or adjusted under 35 U.S.C. 154(b) by 224 days.

(21) Appl. No.: 12/697,496

(22) Filed: Feb. 1, 2010

(65) Prior Publication Data

US 2010/0211790 A1    Aug. 19, 2010

(51) Int. Cl.
*H04L 29/06* (2006.01)
*H04W 12/06* (2009.01)
*H04L 9/32* (2006.01)

(52) U.S. Cl.
CPC .............. *H04W 12/06* (2013.01); *H04L 9/321* (2013.01); *H04L 9/3273* (2013.01); *H04L 9/3297* (2013.01); *H04L 63/065* (2013.01); *H04L 63/0428* (2013.01)

(58) Field of Classification Search
CPC ................... H04W 12/04–12/06; H04L 63/04; H04L 63/0428; H04L 63/0478; H04L 63/06; H04L 63/08; H04L 63/0892; H04L 63/12–63/126; H04L 2463/062; H04L 2463/082; H04L 9/00; H04L 9/006; H04L 9/007; H04L 9/08; H04L 9/0819; H04L 9/0833; H04L 9/088; H04L 9/32
USPC .................... 726/5–7, 10; 455/436, 442–443; 370/328, 331, 338
See application file for complete search history.

(56) References Cited

U.S. PATENT DOCUMENTS

| 6,069,954 | A * | 5/2000 | Moreau | 380/28 |
| 6,732,277 | B1 * | 5/2004 | Vandergeest et al. | 726/19 |
| 7,395,427 | B2 * | 7/2008 | Walker | 713/169 |
| 7,499,547 | B2 * | 3/2009 | Zheng et al. | 380/247 |
| 2003/0145118 | A1 * | 7/2003 | Volpano | H04L 9/3242 709/249 |
| 2004/0078598 | A1 * | 4/2004 | Barber et al. | 713/201 |
| 2004/0203783 | A1 * | 10/2004 | Wu et al. | 455/436 |
| 2004/0236939 | A1 * | 11/2004 | Watanabe et al. | 713/150 |
| 2004/0240412 | A1 * | 12/2004 | Winget | 370/331 |
| 2005/0138362 | A1 * | 6/2005 | Kelly et al. | 713/156 |
| 2005/0204129 | A1 * | 9/2005 | Sudia et al. | 713/158 |
| 2005/0232429 | A1 * | 10/2005 | Chowdhury et al. | 380/277 |
| 2005/0237983 | A1 * | 10/2005 | Khalil et al. | 370/338 |
| 2005/0278532 | A1 * | 12/2005 | Fu et al. | 713/169 |

(Continued)

OTHER PUBLICATIONS

Halasz, David "IEEE 802.11i and wireless security" [Online], Aug. 25, 2004 [Retrieved on Apr. 4, 2012], EETimes [www.eetimes.com], [Retrieved from: http://eetimes.com/discussion/other/4025006/IEEE-802-11i-and-wireless-security].*

(Continued)

*Primary Examiner* — Eric W Shepperd

(57) ABSTRACT

The present invention relates to at least a method of authenticating a user in a communication network including contacting an authentication entity in a first authentication of a user seeking access to the communication network; supplying to the user first information, the first information being generated based on privacy information of the user and shared information, the shared information being shared among all access nodes of a group of access nodes, the group of access nodes including at least a first access node and a second access node, and verifying the privacy information in a second authentication of the user by applying the shared information to the first information. The present invention further relates to a corresponding apparatus.

16 Claims, 11 Drawing Sheets

(56) References Cited

U.S. PATENT DOCUMENTS

| | | | |
|---|---|---|---|
| 2005/0288939 A1* | 12/2005 | Peled | G06F 21/10 709/229 |
| 2006/0018483 A1* | 1/2006 | Das | 380/277 |
| 2006/0067272 A1* | 3/2006 | Wang et al. | 370/331 |
| 2006/0083377 A1* | 4/2006 | Ptasinski | 380/270 |
| 2006/0159031 A1* | 7/2006 | Vialen et al. | 370/252 |
| 2006/0190716 A1* | 8/2006 | Miller | 713/150 |
| 2006/0203776 A1* | 9/2006 | Persaud et al. | 370/331 |
| 2006/0256763 A1* | 11/2006 | Nguyen et al. | 370/338 |
| 2006/0274695 A1* | 12/2006 | Krishnamurthi et al. | 370/331 |
| 2006/0291660 A1* | 12/2006 | Gehrmann et al. | 380/277 |
| 2007/0207818 A1* | 9/2007 | Rosenberg et al. | 455/461 |
| 2007/0250713 A1* | 10/2007 | Rahman et al. | 713/171 |
| 2007/0277035 A1* | 11/2007 | Patel et al. | 713/168 |
| 2007/0280481 A1* | 12/2007 | Eastlake et al. | 380/277 |
| 2007/0293202 A1* | 12/2007 | Moshir | G06F 21/552 455/414.2 |
| 2008/0091941 A1* | 4/2008 | Yonezawa et al. | 713/158 |
| 2008/0192931 A1* | 8/2008 | Cho et al. | 380/258 |
| 2009/0067623 A1* | 3/2009 | Lei et al. | 380/44 |
| 2009/0170476 A1* | 7/2009 | Lin et al. | 455/411 |
| 2009/0300740 A1* | 12/2009 | Verma et al. | 726/6 |
| 2010/0023777 A1* | 1/2010 | Prevost | G06F 21/572 713/180 |
| 2010/0208706 A1* | 8/2010 | Hirano et al. | 370/332 |
| 2010/0266128 A1* | 10/2010 | Asokan et al. | 380/278 |
| 2010/0284368 A1* | 11/2010 | Haddad et al. | 370/331 |
| 2011/0255695 A1* | 10/2011 | Lindholm et al. | 380/278 |

OTHER PUBLICATIONS

Mishra et al "Proactive key distribution using neighbor graphs" [Online], Feb. 2004 [Retrieved on May 8, 2012], Wireless Communications, IEEE, vol. 11 Issue: 1 pp. 26-36 [Retrieved from: http://ieeexplore.ieee.org/stamp/stamp.jsp?tp=&arnumber=1269714 ].*

Kim et al "SFRIC: A Secure fast Roaming Scheme in Wireless LAN using ID-based Cryptography" [Online], Jun. 24-28, 2007 [Retrieved on Apr. 8, 2012], IEEE International Conference on Communications, pp. 1570-1575 [Retrieved from: http://ieeexplore.ieee.org/stamp/stamp.jsp?tp=&arnumber=4288934 ].*

* cited by examiner

AUTHENTICATION

RELATED APPLICATIONS

This Application claims priority of Chinese Patent Application No. 200910009511.9, which was filed on Feb. 13, 2009. The entire contents of the Chinese Patent Application are hereby incorporated herein by reference.

BACKGROUND

In modern data communication systems, security is one of the major problems. With more and more information being transferred over data communication systems and more and more user applications with security critical information are running on devices connected to such communication systems the intrusion into a communication system or the breaking of security related mechanism may have disastrous implications. In order to prevent attacks or intrusions by hostile users, the user is requested in many communication networks to authenticate before starting a data communication via an access node of the communication network. Various mechanisms for authentication are known for example the authentication process according to Institute of Electrical and Electronics Engineers (IEEE) 802.1X. On the other hand, modern data communication requires having an access to the communication network as easy as possible and as quick as possible. Existing communication networks, e.g. authentication mechanism such as the IEEE 802.1X, may provide secure authentication but consume quite some time in providing the authentication.

DETAILED DESCRIPTION

The following detailed description explains exemplary embodiments of the present invention. The description is not to be taken in a limiting sense, but is made only for the purpose of illustrating the general principles of embodiments of the invention while the scope of protection is only determined by the appended claims.

Further, it is to be understood that the features of the various exemplary embodiments described herein may be combined with each other, unless specifically noted otherwise.

In the various figures, identical or similar entities, modules, devices etc. may have assigned the same reference number.

Figure 1:
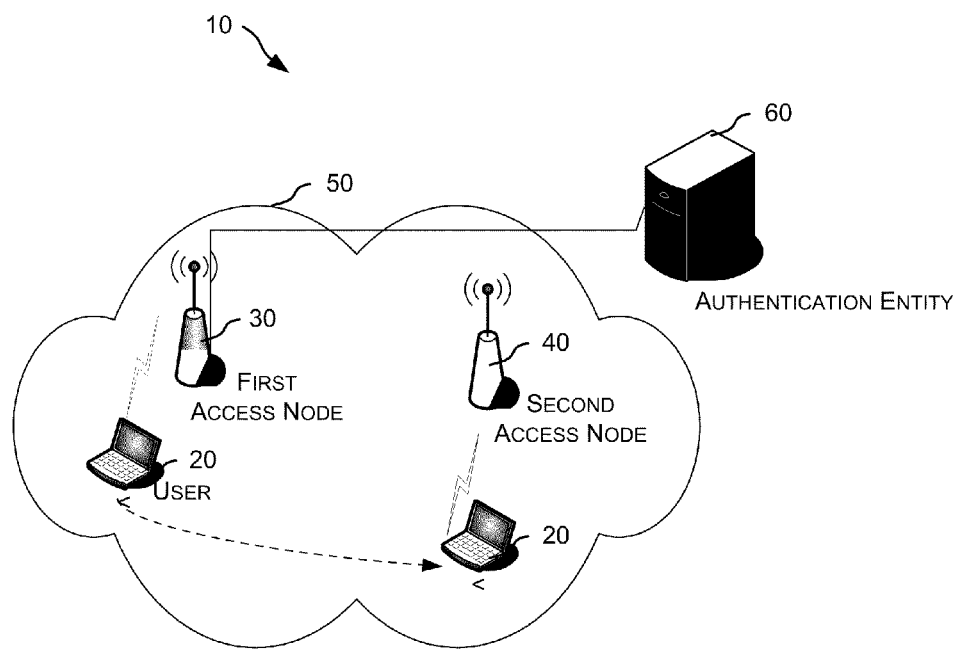
FIG. 1 shows a block diagram of a communication network according to an embodiment.

Referring now to FIG. 1, a communication network 10 according to an embodiment has a user 20, a first access node 30 and a second access node 40. The first access node 30 and the second access node 40 are access nodes of a group 50 of access nodes. The term "user" as used herein has a broad meaning and includes such devices as for example stationary communication devices (Personal Computers, Set-Top Boxes, printers, or other electronic stationary devices such as communication-controlled stationary devices) and mobile communication devices (Notebooks, Laptops, mobile phones, Personal Digital Assistants or other electronic devices such as for example communication-controlled domestic appliance devices). The user may be capable to transmit data to the communication network by a wireless connection such as for example a station of a wireless local area network (WLAN) and/or a wired connection e.g. via at least the first and second access nodes. Communication networks may include for example a wireless communication network such as WLAN (wireless local area network), wired communication networks such as a home network utilizing cable or power line connections or a communication networks using a mixture of wireless or wired connections such as for example a home network utilizing wireless LAN and power-line connections. For providing the above communications, the user and the access node may have appropriate receivers, transmitters or transceivers implementing the data communication in accordance with respective communication protocols. In some embodiments, the communication network may be of a pure shared-medium type. In one embodiment, the communication network may be implemented as a wireless LAN (Wireless Local Area Network) in which the group 50 of access nodes forms an extended service set (ESS). In other embodiments, the communication network may be a group of communication devices configured to build a home network. FIG. 1 further shows an authentication entity 60 which is at least connected to the first access node 30. In embodiments, the authentication entity 60 is connected to each access node of the group of access nodes.

Figure 2:
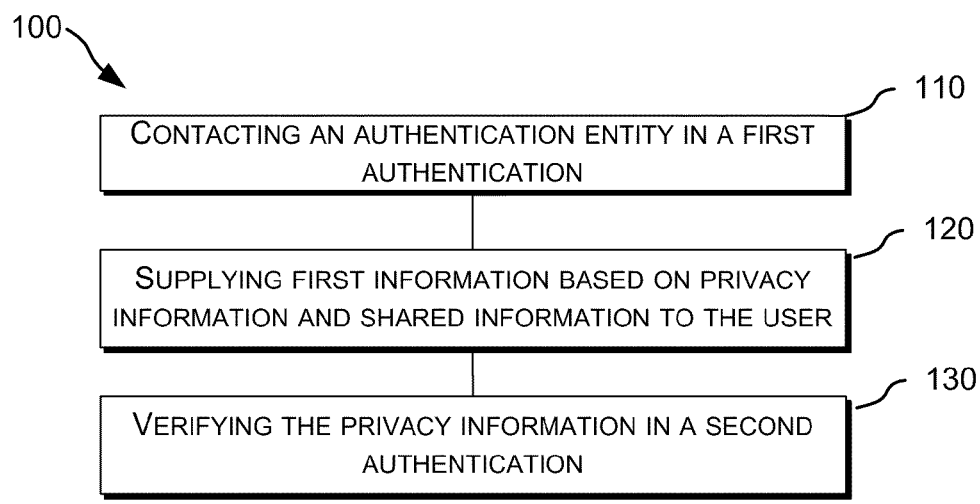
FIG. 2 shows a flow chart diagram according to an embodiment.

FIG. 2 shows now a basic embodiment of a method 100 of authenticating a user in a communication network such as the communication network 10 shown in FIG. 1.

In 110 an authentication entity is contacted in a first authentication of a user seeking access to the communication network.

In 120 first information is supplied to the user, the first information being generated based on privacy information of the user and shared information. As indicated in 120, the shared information is shared among all access nodes of a group of access nodes. The group of access nodes includes thereby at least a first access node and a second access node. To illustrate one example of a WLAN communication, the group of access nodes may include all access points of an extended service set of a WLAN.

In 130, the privacy information is verified in a second authentication of the user by applying the shared information to the first information.

In the method 100, the first authentication of the user may be performed when the user seeks to connect to the communication network at the first access node and the second authentication may be performed when the user seeks to connect to the communication network at the second access node. However it is to be noted that in embodiments each of the first and second access nodes may be capable to provide the first and second authentication.

In one embodiment, the first authenticating of the user is performed when the user seeks connection to the communication network at one of the access nodes of the group of access nodes which is an access node which is accessed for the first time within a session, e.g. the first access node. After performation of the first authentication, the user is authenticated by verifying the privacy information when the user seeks a further connection to the communication network at one or more of the access nodes of the group of access nodes.

The verifying of the privacy information may be part of a hand-off process or roaming wherein the user changes from a connection to the network via the first access node to a connection to the network via the second access node. Then, the method 100 may include a transferring of the privacy information from the user to the second access node previous or during a hand-off of the user from the first access node to the second access node and the second access node authenticates the user using the second authentication based on the verifying of the privacy information. Hand-Off processes occur for example in WLAN hand-off when a station leaves the basic service set (BSS) of an access point to enter a new access point.

The shared information may be a key which is shared among all of the access nodes within the group of access nodes but is otherwise secret. In embodiments, the shared information may include a first shared key and a second shared key. The first shared key may be used to provide encryption for the first information while the second shared key may be used to provide integrity check or other trustiness checks of the first information presented by the user to one of the access nodes during the second authentication.

The authentication entity utilized in the first authentication may be provided external to the access node acting as authenticator and external to the user in a separated entity. However, in an embodiment, the authentication entity may be integrated in the access node acting as authenticator.

The authentication entity may be in one embodiment an authentication server providing authentication for the group of access nodes. The authentication server may however be integrated in one of the access nodes. In embodiments, the authentication entity may include a RADIUS (Remote Authentication Dial In User Service) component or may be a RADIUS server. The authentication entity may also provide authorization for the user. In embodiments, the authentication entity may include a PKI (Public Key Infrastructure) component providing certification services.

The second authentication may be performed or executed without accessing the authentication entity, i.e. without transferring any messages to the authentication entity or receiving any message from the authentication entity. As will be described in more detail below, a fast authentication can be provided at each of the access nodes by utilizing the second authentication. The second authentication is based here on the performed first authentication. The verifying of the privacy information in method 100 may then indicate to the access node that the user has already previously been authenticated by the first authentication. It is to be noted that in embodiments each of the access nodes of the plurality of access nodes may be capable to provide the first and second authentication. In the first authentication, the access node may act as authenticator but the authentication will be essentially provided by the authentication entity (for example by an authentication server). Therefore, in the first authentication, messages from the user are transferred via the access node acting as authenticator to the authentication entity and from the authentication entity via the access node acting as authenticator to the user. However, in the second authentication the access node authenticates the user without having to access the authenticator entity based on the previous first authentication.

The first information may be regarded in embodiments as a "badge" or "badge information" handed from the access node to the user. The first information may be presented after the first authentication each time the user intends to seek a connection or association with an access node. The first information is in embodiments capable to let the access nodes of the group of access nodes allow a verification of the first information. Thus, the first information can be used in such embodiments to provide an easier and faster authentication once the user has been authenticated by the first authentication by only verifying that the user contains valid first information wherein a valid first information indicates that that the user has properly undergone the first authentication and has been properly identified by the first authentication.

In embodiments, the first and second authentications are different authentication processes implementing at least different steps or different protocols of authenticating the user. For example, in one embodiment as will be described later, the first authentication is an authentication according to full IEEE 802.11 standard wherein the access node is the authenticator and the authentication entity is an authentication server providing RADIUS services while the second authentication provides a faster authentication not utilizing the time-consuming full 802.11 authentication method. In one embodiment, the second authentication uses the first information and modifies the 4-way authentication procedure in the IEEE 802.11i standard. It is possible to generate a master key required by a transient key without having to access the authentication server. The master key is generated locally by the user based on a Nonce presented by the user and a Nonce presented by the access node.

In an embodiment, the privacy information may be verified in the second authentication by applying the shared information to the first information. The privacy information may in one embodiment include a secret key. The first information may be generated by applying the shared information to the secret key. In one embodiment the privacy information may be a part or a section of a pairwise transient key generated during the authenticating of the user.

In one embodiment the method 100 includes encrypting the privacy information by using the shared information as key for this encryption. In the second authentication, the privacy information may be retrieved from the first information by decrypting the first information using the shared information.

The retrieved secret key (privacy information) may be used to check or verify the integrity and/or confidentiality of the first information presented by the user during the second authentication. To this end, the secret key may be used in the second authentication mode to decrypt one or more messages transmitted by the user.

The secret key may be a key generated during the first authentication. In one embodiment, the secret key may be part of a pairwise transient key generated by using a pairwise master key which previously has been generated by the authentication server during the first authentication.

In embodiments, the first information may be generated by applying the shared information not only to the secret key but also to other information such as an identifier or identifier of the user. Such an identifier may for example include a communication address used during the data communication for example a Media Access Control (MAC) address. Applying the shared information may in embodiments include an encryption process wherein the shared information is the encryption key for the encryption process.

Thus, in one embodiment, the first information may be the result of an encryption of the secret key derived from a master key and the identifier with the shared information as encryption key. Or in other words, the method 100 may include a generating of the first information by encrypting the first key and the identifier of the user. In other embodiments, the first information may include also information such as a timestamp indicating a time period during which the first information is deemed to be valid and/or information resulting from a one-way transformation of the information provided in the first information. Examples of such one-way transformations of an information M are a pair of (M, $PRF_K(M)$) where $PRF_K$ (M) is a keyed pseudo-random function such as a CBC-MAC (Cipher Block Chaining Message Authentication Code) or a keyed cryptographic hash function (HMAC=Hash Message Authentication Code). The life time may be used to verify a lifetime of the first information when the privacy information is verified. The one-way transformation may be used to provide an integrity or trustiness check of the first information when the first information is presented to the access node during the second authentication. One embodiment of such a check modifies the method 100 to include a decrypting of the first information by using the shared key. Then, by the decrypting, the secret key and the first identifier are retrieved. Finally, by checking the integrity or trustiness, it can be verified whether the first information has been modified illegally.

The second encoded information may in an embodiment further include a Nonce for generating a pairwise transient key from a pairwise master key and/or a timestamp.

When the second encoded information includes a Nonce (Number used once) for generating a pairwise transient key from a pairwise master key, the method 100 may further be modified to include the retrieving of the Nonce from the second encoded information. The Nonce may be a random or pseudo-random number. Then a pairwise transient key is generated by using the retrieved Nonce. The pairwise transient key can be used in a further communication between the user and an access point the user seeks to connect to.

The first information may be presented by the user as a message or part of a message within a predetermined protocol. For example, the message may be a message within a modified version of the 4-way Handshake protocol as described in IEEE 802.11i.

In embodiments, the message may include in addition to the first information also a message integrity code and/or a Nonce for the message communication.

The secret key retrieved in the second authentication may further be used to decrypt a further message from the user. The message may comprise an identifier of the user and the identifier retrieved from the second information may be compared to an identifier retrieved from decrypting the first information.

The second authentication can be repeated multiple times for example to provide to the user multiple times a connection to the communication network. Rather to illustrate than to limit, one example would include situations when the user moves along an extended service set (ESS) of a WLAN system. In this case the hand-off procedure from one access point to the other access point can be realized in a much faster way.

In embodiments, each time the second authentication is performed new first information may be generated. The new first information may then be transmitted to the user. When the user connects to another access node of the group of access nodes, the user presents this new first information to the respective access node. The new first information is then verified based on the applying of the shared information using the new first information. Thus, the method 100 may include a newly generating of the first information after the first information is verified. The newly generated first information may be different than the previous first information. The newly generated first information may be transferred to the user.

In one embodiment, a transient pairwise master key is generated after the verifying of the user in the second authentication. In one embodiment, the pairwise transient key is generated based on a pairwise master key which is generated previous to the generation of the pairwise transient key during the second authentication. Then, method 100 may include a generating of a pairwise master key when the first information is verified and subsequently the generating a pairwise transient key based on the pairwise master key. In addition, the privacy information can be newly generated based on the newly generated pairwise transient key. Then, based on the newly generated privacy information, the first information can be newly generated by applying the shared information to the newly generated privacy information. Finally the newly generated first information is transferred to the user for the use of the user in the next time the user seeks connection to another access node.

It is to be understood that the above described embodiment of method 100 and its derivatives may be implemented in access nodes or communication devices. Thus, an access node or a communication device may be configured to perform one or more of the above described embodiments of method 100 or parts of the above described methods. In one embodiment thereof, a communication device may comprise a first entity configured to receive from a user first information, wherein the first information is generated based on privacy information of the user and predetermined information. The first entity may realize applying the predetermined information to the first information, and may further be configured to authenticate the user. It is to be noted that the predetermined information may be the information which is shared among all the access nodes of the group of access nodes as described above. Furthermore, it is also to be understood that the method 100 and its derivatives may be implemented in a communication network such as the communication network shown in FIG. 1.

Figure 3:
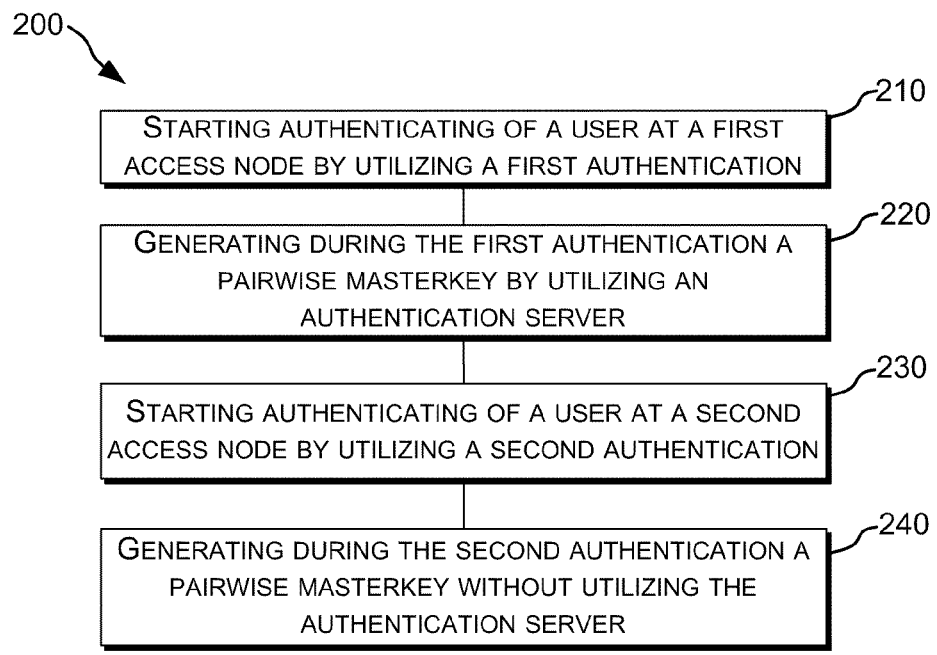
FIG. 3 shows a flow chart diagram according to an embodiment.

A further basic embodiment of a method 200 will now be described with respect to FIG. 3. In the method 200, authenticating of a user is started at a first access node of a communication network by utilizing a first authentication at 210. In the first authentication, a first pairwise master key (PMK) is generated by an authentication server such as a RADIUS server or an authentication, authorization, and accounting (AAA) server at 220. Then, at 230, a second authenticating of the user is started at a second access node of a communication network. In the second authentication, at 240 a second pairwise master key is generated without utilizing the authentication server. The generating of the pairwise master key may base on first key information presented by the user and second key information presented by the second access node. The first and second key information may be in one embodiment a first and second Nonces which are used for generating the pairwise master key. In one embodiment, the first Nonce may hereby be locally generated at the second access node and transmitted from the second access node to the user while the second Nonce may be generated locally at the user and transmitted from the user to the second access node. In this case, the information of the second access node is encrypted.

In another embodiment, the second pairwise master key may be generated locally by the second access node based on a first nonce transmitted from the user to the second access node and a second nonce presented by the second access node.

It is to be understood that many derivatives, i.e. variations, supplements or refinements of the basic method 200 can be provided. In particular, the variations, supplements or refinements described with respect to the basic method 100 may be also provided or incorporated into method 200. Rather than explicitly specifying such features, reference is made to the above description.

It is again to be understood that also for the embodiment of method 200 and derivatives thereof may be implemented in access nodes or communication devices. Thus, an access node or a communication device may be configured to perform one or more of the above described embodiments and derivatives of method 200 or parts of the above described method 200 and its derivatives. Furthermore, it is also to be understood that the method 200 and its derivatives may be implemented in a communication network such as the communication network shown in FIG. 2.

Figure 4:
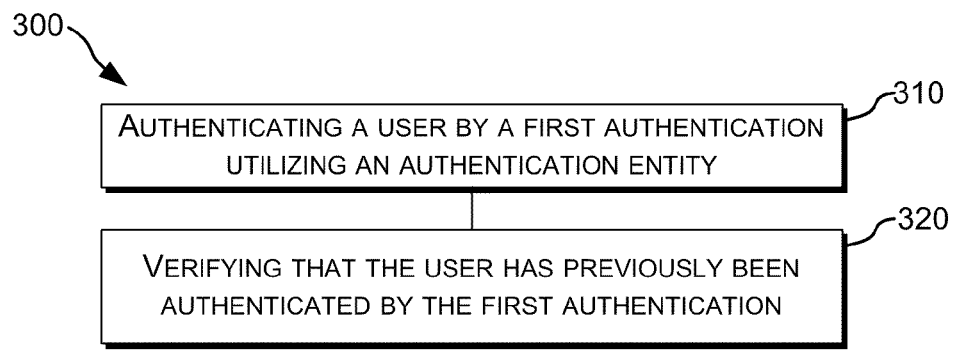
FIG. 4 shows a flow chart diagram according to an embodiment.

A further basic embodiment of a method 300 will now be described with respect to FIG. 4. The method 300 includes at 310 an authenticating of a user by a first authentication, the first authentication utilizing an authentication entity. At 320, authenticating the user using a second authentication based on verifying that the user has previously been authorized in the first authentication.

As described above, the authentication information that the user has previously been authenticated in the first authentication may include the presenting of first information in the second authentication by the user to one of the access node of the group of access nodes. Furthermore, as has already previously been mentioned, the first information may be generated during the first authentication by the access node acting as authenticator in the first authentication.

It is to be understood that many derivatives, i.e. variations, supplements or refinements of the basic method 300 can be provided. In particular, the variations, supplements or refinements described with respect to the basic method 100 and 200 may be also provided or incorporated into method 300. Accordingly, reference is made to the above description.

It is also to be understood that the method 300 and derivatives thereof may be implemented in an access node or communication device or a communication network. Thus, an access node or a communication device or a communication network may be configured to perform one or more of the above described embodiments and derivatives of method 200 or at least parts of the above described method 200 and its derivatives.

Rather for illustration than limitation, some embodiments of a wireless local area network will now be described in more detail. Prior to further explain these embodiments, some conventions on syntactic structures used in the following are explained. The conventions used in the following are as follows:

A→B: M: A sends to B a message M;

$K, K_{XY}, K_X \ldots$ : cryptographic keys, where $K_{XY}$ denotes a key shared between principals X and Y, and $K_X$ denotes a public key of principal X;

$PRF_{-n}$: pseudo-random function producing n bits of output;

L(str,F,L): from str starting from the left, extract bits F through F+L−1, using IEEE 802.11 bit conventions;

$N, N_a, N_X \ldots$ : Nonces, which stands for "number use for once"; these are random numbers sampled from a sufficiently large space; $N_X$ is generated by principal X;

$T_X$: a timestamp created by principal X;

$\{M\}_K$: denotes a result of an encryption of message M using the key K;

$[M]_K$: denotes a result of a one-way transformation of the message M using the key K. In practice, $[M]_K$ can be realized for example by a pair $(M, PRF_K(M))$ where $PRF_K$ denotes a keyed pseudo-random function (e.g., CBC-MAC or a keyed cryptographic hash function, HMAC).

K, K': shared-key among a group of access points (APs). K is used for encryption and K' is used for generating Message Integrity Code (MIC) (in the following exemplary embodiment, every access point of the predetermined group of access points shares the same K and K');

$K_{AP}$: public key of an access point;

$K_{AP}^{-1}$ private key of an access point, wherein every access point has its own $K_{AP}$ and $K_{AP}^{-1}$.

Figure 5A:
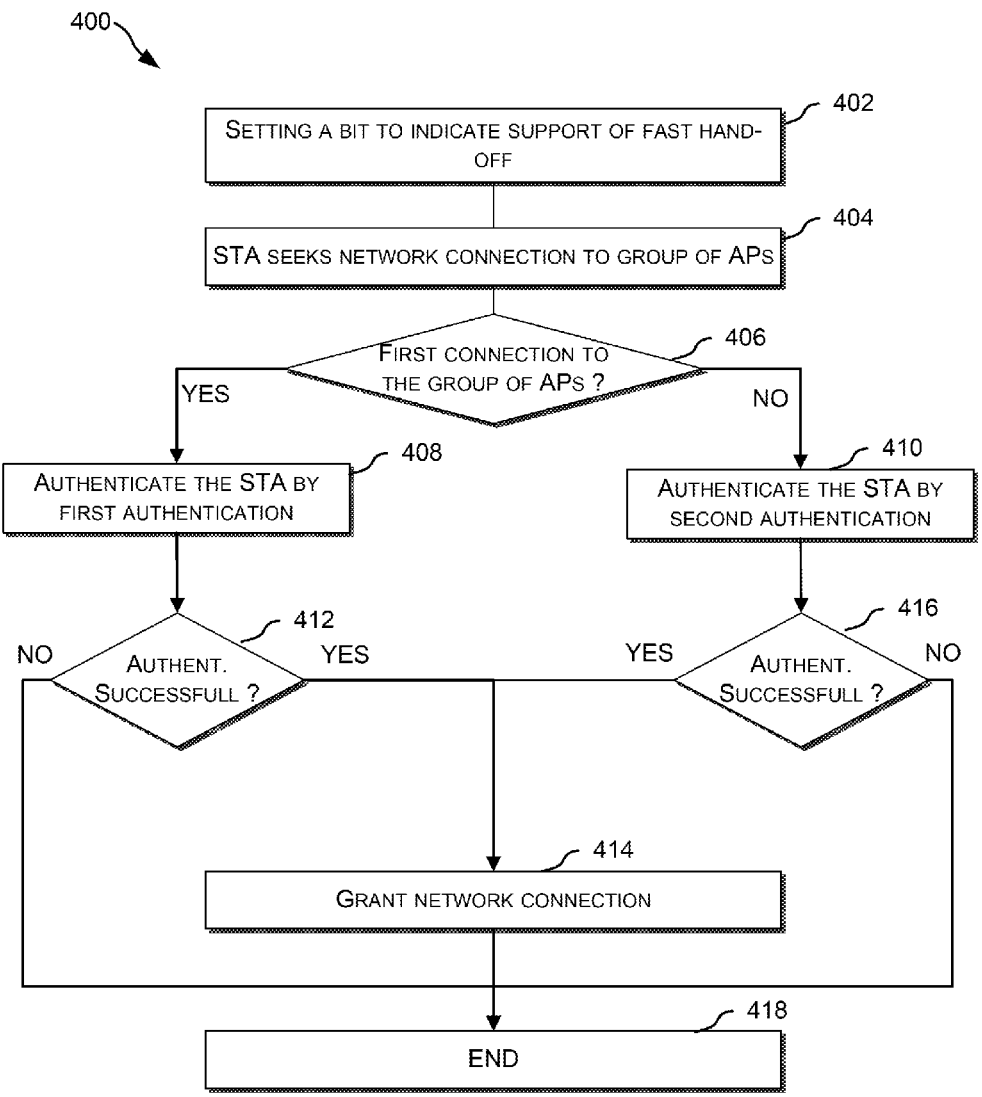
FIGS. 5A-5E show flow chart and message diagrams according to embodiments.

Referring now to FIG. 5a, a flow diagram 400 according to an embodiment includes at 402 the setting of a bit indicating that the group of access points is capable of providing a fast hand-off by utilizing the second authentication. The setting is capable to keep consistency with IEEE 802.11i standard by setting the Robust Security Network (RSN) field in IEEE 802.11i standard which indicates the requested capabilities advertised by the node, this is accomplished by adding a "fast hand-off" subfield for example at bit 6. Setting the "fast hand-off" subfield to logical 1 may indicate that the fast hand-off mechanism is supported and a setting to 0 may indicate that the "fast hand-off" mechanism is not supported.

Setting of the "fast hand-off" subfield may be provided prior the first performing of a connection with the access point. The station sets the fast "hand-off" subfield to 1 when it owns the first information. In this embodiment, the first information is referred to also as a "Badge".

In some embodiments, the access point might find out whether the station supports a fast hand-off by checking the request frame of the station.

At 404, a station (STA) seeks a network connection to the group of access points.

At 406, it is judged whether the station connects the first time to the group of access points. In one embodiment, it is also determined whether the station and the access point support the "fast hand-off" protocol. If either of them does not support the fast hand-off protocol, the first authentication will be performed. In one embodiment, the determination may be made based on whether the user presents the first information indicating that the station has previously accomplished the first authentication with the group of access points and has been connected to the group. If the station is connecting the first time, the station will perform the first authentication at 408 which will be described in further detail in FIG. 5b. If not the station will perform the second authentication at 410 which will be described in more detail in FIG. 5c.

In case the first authentication is performed, at 412, if the authentication is successful, the station will get granted for network connection at 414 and the process ends at 418. If the station is not connecting for the first time, the station will perform the second authentication at 410 which will be described in further detail in FIG. 5d. If the station performs the second authentication and if at 416 it is judged that the second authentication has been successful, the process proceeds to 414 granting network access for the station. If not, the process will again end at 418.

Figure 5B:
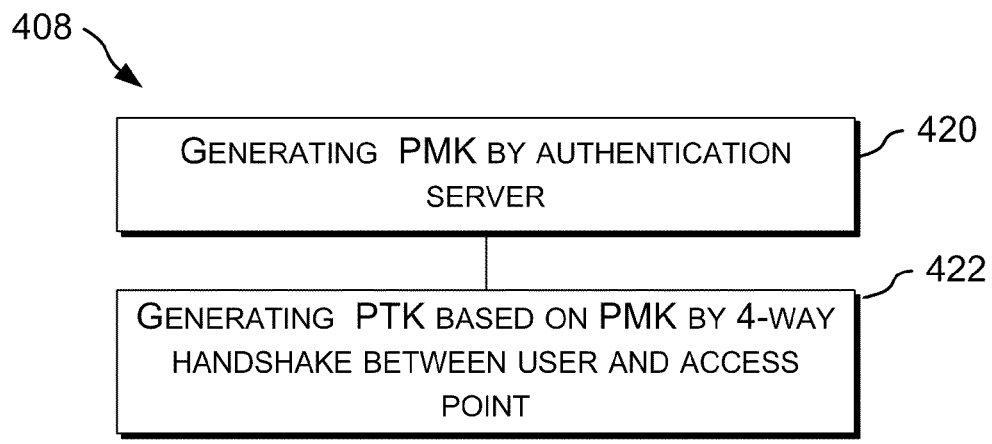

Referring now to FIG. 5b, the authenticating by the first authentication at 408 will be described in more detail.

Figure 5C:
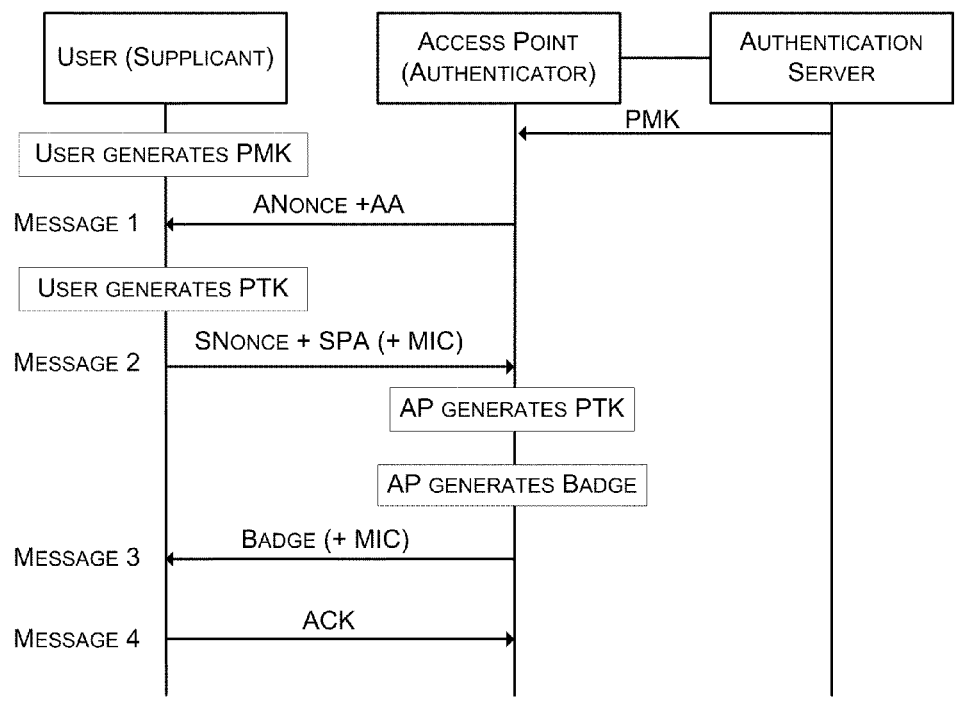

As shown in FIG. 5b in the first authentication 420 a master key pair (PMK) is generated by the authentication server and transferred to the access point acting as authenticator (authenticator port access entity). The user acting as a supplicant can derive the same master key pair using the same secret elements and algorithms as the authenticator. FIG. 5c shows the transmitting of the master key pair using for example an EAP (Extensible Authentication Protocol) exchange mechanism.

Based on the master key pair, a transient key pair is generated by the access point in a 4-way message (4-way handshake) process in 422. The 4-way message process will be described in more detail in the following. In message 1 of the 4-way message process, a Nonce of the Authenticator (ANonce) is transferred from the authenticator to the supplicant together with the Authenticators MAC address (AA). The message 1 may contain further information such as a masterkey pair identifier (PMKID). After receiving the message 1 from the authenticator, the supplicant (user) is now capable of generating the transient key pair (PTK) by putting the Nonce transmitted based on the authenticator, its own Nonce (SNonce), the transmitted address of the authenticator (AA) and its own address (SPA) into a cryptographic hash table:

PTK←PRF$_{-X}$(PMK,"PairwiseKeyExpansion",Min(AA, SPA)∥Max(AA,SPA)∥Min(ANonce,SNonce)∥Max(ANonce, SNonce))

Different parts of the transient key pair derived from above are capable to be assigned to different keys (subkeys) for the communication. Thus, the transient key pair divides into a plurality of keys. One of the keys assigned within the transient key pair is a fast hand-off key which constitutes the privacy information used in generating the first information for allowing the fast handoff by using the first information for validating. Conventional transient key pairs do not contain a fast hand-off authentication key (FHAK) $K_h$. The transient key pair generated by the above contains therefore additional bits compared to conventional transient key pairs in order to reflect the additional fast hand-off authentication key within the transient key pair. In an embodiment, the transient key pair may include additional 256 bits (32 bytes) accounting for the fast hand-off key. The size of the transient key pair may be dependent on the security mode. For example conventional transient key pairs have a size of 512 in the TKIP (Temporal Key Integrity Protocol) mode or a size of 384 in CCMP (Counter Mode with CBC-MAC) mode. These sizes are extended by the additional bits accounting for the fast hand-off authentication key. Thus, in the above embodiment, the transient key pair for the TKIP mode may have a size of 512+256=768 bits, where the fast hand-off authentication key $K_h$ may be derived from the bits 512 to 767 of the transient key pair, i.e. $K_h$←L(PTK,512,256). In the case of a CCMP mode, the fast hand-off transient key may have a size of 384+256=640 bits, where the fast hand-off authentication key may be derived from the bits 384 to 639 of the transient key pair, i.e. $K_h$←L(PTK,384,256).

In a message 2, the supplicant submits its Nonce (SNonce) to the authenticator together with the MAC address of the supplicant (SPA). Message 2 may also include a MIC (Message Integrity Code). Thereafter the authenticator is capable of generating the transient key pair as described above.

Being capable to derive now also the fast hand-off authentication key $K_h$, the authenticator generates the first information which will be herein referred to as "Badge". The Badge is generated as follows: Badge←$\{SPA,K_h,T_{life},\{SPA,K_h,T_{life}\}_{K'}\}_K$.

In other words, the Badge is generated by encrypting with the shared key K the fast hand-off key, the supplicant MAC address (SPA), a lifetime information indicating the badge which is related to the master key pair lifetime, as well as a Message Integrity Check Information which is generated by a one way-transformation of the fast hand-off authentication key, the supplicant MAC address (SPA) and the lifetime information. The one way transformation provides Message Integrity Checking capability for the Badge and is generated by using the shared K' of the one-way transformation encryption.

It is to be noted here that the Badge is generated based on privacy information solely shared between the authenticator and the supplicant, i.e. the fast hand-off key $K_H$ and the MAC address of the supplicant. For encrypting these privacy information and for providing the integrity check, keys K, K' are used which are only shared among the group of access points, i.e. which is privacy information of the group of access points while it is kept secret to any other devices outside the group of access points. With this, the owner of the badge is capable to provide to any other access point of the group of access points the verifying badge indicating that it has been correctly authenticated in the first authentication as will be outlined in more detail below.

In message 3 an acknowledgement is transmitted from the authenticator to the supplicant together with the Badge. Message 3 may also include a message integrity code for allowing checking of integrity and other information such as a sequence number to be used in a next multicast or broadcast frame. Finally, in message 4, the supplicant sends a confirmation to the authenticator.

Figure 5D:
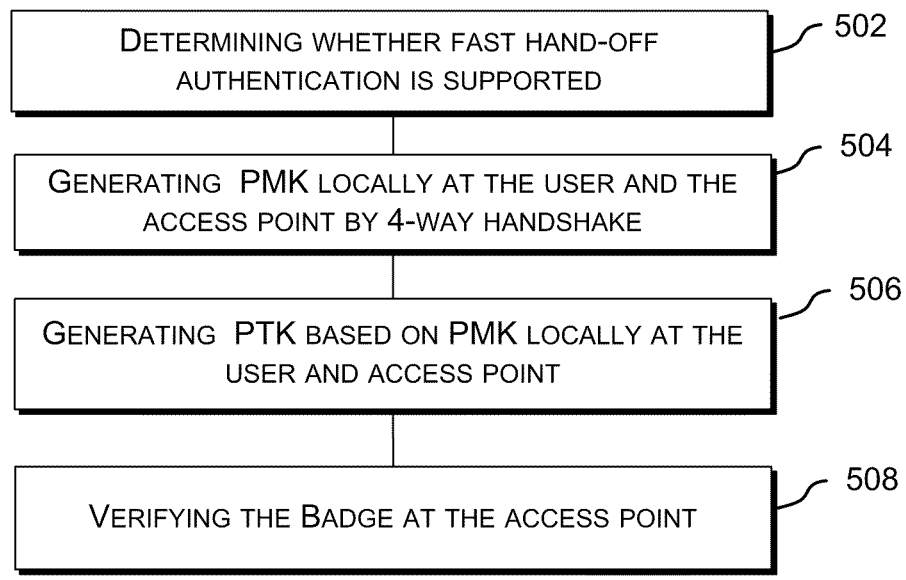

Having now described the first authentication 408, in the following a more detailed description of the second authentication 410 in flow diagram 400 will be given with respect to FIG. 5d.

In the second authentication, at 502 it will firstly be judged by the access point whether the user supports a fast hand-off authentication. As described above, the second authentication may be necessary in a hand-off process, when the user leaves the basic service set (BSS) of a first access point and associates with the basic service set of a second access point, the second access point has to authenticate the user. Since the fast hand-off authentication has been indicated by setting the corresponding bit in 402, the second authentication may provide an authentication by using a 4-way message process. At 504, a master key pair is generated locally at the supplicant (user) and the authenticator (access point). As will be described clearly below, the generation of the master key pair at the supplicant and the authenticator may be done at different times, i.e. not simultaneously. At 506, a transient key pair is generated locally at the supplicant (user) and the authenticator (access point). As will be explained clearly below, the generation of the transient key pair at the supplicant and the authenticator may be done at different times, i.e. not simultaneously. At 508, the Badge presented by the supplicant is verified by the authenticator. A more detailed description of the usage of a 4-way message process to implement the above mentioned implementating procedure will now be provided with respect to FIG. 5e.

Figure 5E:
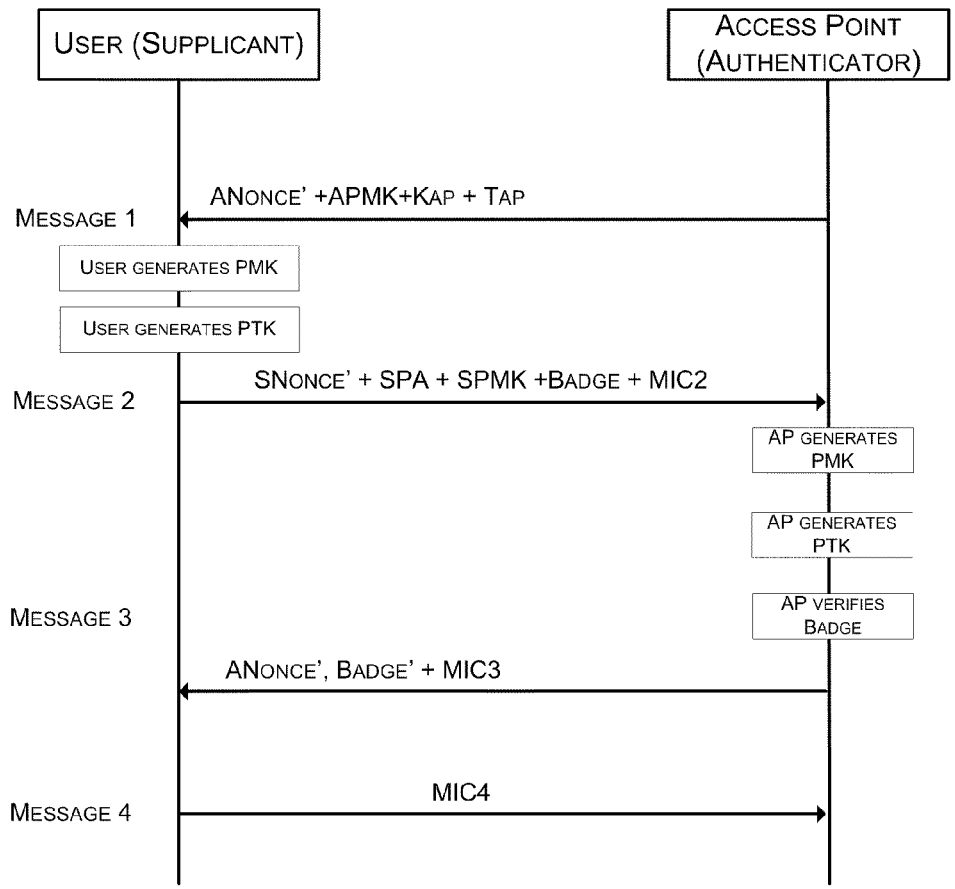

In FIG. 5e, a message 1 of the 4-way message process is transferred from the authenticator to the supplicant. The message 1 includes a Nonce of the Authenticator (ANonce') and a further Nonce APMK both generated by the authenticator. The Nonce ANonce' is used for accomplishing the 4-way handshake while the Nonce APMK is used to contribute to the generation of a new master key pair. Together with these two Nonces, the message 1 includes the public key $K_{AP}$ of the access point and a timestamp $T_{AP}$ generated by the authenticator. In message 2, the supplicant transmits to the authenticator the Nonces SNonce' and SPMK generated by the supplicant together with the Badge, the MAC address SPA of the supplicant, a timestamp information $T_{AP}$ and a Message Integrity Code MIC2. In the message 2, SPMK is encrypted by using the public key $K_{AP}$ of the authenticator. The encrypted SPMK, the MAC address SPA and the timestamp information $T_{AP}$ are encrypted using the fast hand-off authentication key $K_H$. In other words, message 2 comprises the following information:

SNonce',$\{SPA,T_{AP},\{SPMK\}_{K_{AP}}\}_{K_h}$, Badge, MIC2.

In the 4-way message according to FIG. 5e, after receiving message 1, the supplicant is capable of generating a new master key pair based on the received Nonce APMK and the SPMK generated on its own. In more detail, the master key pair is generated by a pseudo-random function process PRF having the following function: $PMK \leftarrow PRF_{-256}(APMK \| SPMK)$, wherein the two Nonces APMK and SPMK serve as its inputs.

After receiving the message 1, the supplicant is also capable to generate the transient key pair by using the new master key pair and the transmitted ANonce' and the SNonce' generated on its own. The transient key pair is generated based on the master key pair in the same manner as described for the first authentication by
$PTK \leftarrow PRF_{-X}(PMK, \text{"PairwiseKeyExpansion"}, Min(AA, SPA) \| Max(AA, SPA) \| Min(ANonce', SNonce') \| Max(ANonce', SNonce'))$ Furthermore, after receiving the message 2, the authenticator is also capable of generating the new master key pair. In more detail, after receiving the message 2, the access point checks the received Badge with the shared keys K and K'. If the badge is correct, the authenticator will get the fast hand-off authentication key $K_H$. By using the fast hand-off authentication key $K_H$, the authenticator is capable of decrypting the SPMK. With the transmitted SPMK and the APMK generated on its own, the master key pair is generated identical to the generating performed by the supplicant according to $PMK \leftarrow PRF_{-256}(APMK \| SPMK)$.

Because of the Badge being generated by $Badge \leftarrow \{SPA, K_h, T_{life}, \lfloor SPA, K_h, T_{life} \rfloor_{K'}\}_K$, only a valid authenticator can get the $K_h$ by using K to decrypt the Badge and check whether the Badge is forgery by using K' to verify the message integrity code. After that, the authenticator can use $K_h$ to decrypt $\{SPA, T_{AP}, \{SPMK\}_{K_{AP}}\}_{K_h}$ to get the SPMK and at the same time the access point AP can check whether $K_h$ is fresh and valid by verifying the values of $T_{AP}$ and comparing the SPA retrieved from the Badge with the SPA contained in message 2. The authenticator can alternatively or in addition verify the validity of $K_h$ by verifying SPMK retrieved from decrypting $\{SPA, T_{AP}, \{SPMK\}_{K_{AP}}\}_{K_h}$ in utilizing the message integrity code transmitted in a message 4 which will be described below. The authenticator is therefore capable to determine whether the Badge is valid and the Badge does belong to the STA. A valid Badge can only be the information obtained by the authentication server in the first authentication, thus, the supplicant is authenticated thereby to the authenticator. If the authenticator judged that the Badge is not valid or the lifetime has expired, the authenticator would end the second authentication and would start using the authentication server the first authentication or an authentication according to an existing IEEE 802.11i protocol.

Furthermore, identical to the generating performed by the supplicant, after receiving message 2, the authenticator is capable to generate the transient key pair by using the master key pair just generated and the transmitted SNonce' and the Nonce ANonce' generated on its own by
$PTK \leftarrow PRF_{-X}(PMK, \text{"PairwiseKeyExpansion"}, Min(AA, SPA) \| Max(AA, SPA) \| Min(ANonce', SNonce') \| Max(ANonce', SNonce'))$.

It is further to be noted that the authenticator can check the integrity of the received message by verifying the MIC in message 2 for example by using a KCK (Key Confirmation Key) process. If the result of this verification is correct, the authenticator will generate a message 3 and submit it to the supplicant. The message 3 contains the same Nonce ANonce' used for the message 1, a new Badge herein referred to "Badge 2" and a Message Integrity Code MIC3. "Badge 2" is generated by first extracting a new fast hand-off authentication key from the part of the transient key pair which is assigned to the fast hand-off key, for example using the bits 384 to 639 for CCMP mode or 512 to 767 for the TKIP mode as described above.

With the new fast hand-off key, the authenticator generates the new Badge similar to the generation of the Badge as described with respect to the first authentication.

After receiving the message 3, the supplicant can determine that the authenticator is not a fake access point by checking the message integrity code MIC3 in message 3. Only if the authenticator can generate a correct transient key pair, the message 3 would contain the correct MIC3 which can be detected by the supplicant. Thus, with the above described second authentication, a mutual authentication is implemented.

Finally, a message 4 is transmitted from the supplicant to the authenticator including a Message Integrity Code MIC4. As outlined above, MIC4 can be used to verify $K_h$. The authenticator could judge from MIC4 if $K_h$ would not be correct since the KCK of MIC4 is derived from the master key pair (PMK). Since the master key pair is derived from SPMK, only the correct $K_h$ can decrypt the SPMK.

With the above described embodiments, a time-consuming authentication by using for example the existing IEEE 802.1X EAP authentication can be avoided by locally generating the master key pair at the user (supplicant) and the access point (authenticator). Thereby, the latency during hand-off is reduced which is important for providing time sensitive applications such as VoWlant (Voice over WLAN). The user can be multiple times authenticated to the access points of the group of access points by using the process of the second authentication described above. The using of the second authentication is restricted by the lifetime of the Badge. Once the lifetime of the badge (a lifetime of the master key pair) is expired, the supplicant has again to use the first authentication for providing an authentication wherein the authentication server is contacted similar to the IEEE 802.1X EAP authentication. Thus, a user can authenticate using the second authentication only when he has previously been authenticated using the first authentication and the lifetime of the Badge is not expired.

The second authentication further uses only a 4-way handshake protocol in which exchanged Nonces are used for locally generating the master key pair at the user and the access point without contacting an authentication server such as a RADIUS server. The use of the 4-way handshake protocol not only improves the hand-off performance but also provides a robust authentication service. Furthermore, in the second authentication no data base of a master key pair identification (PMKID) has to be recorded and maintained by the authenticator as used in the existing authentications according to 802.1X EAP.

Furthermore, the shared key(s) used herein in each of the access points of the group for verifying the Badge is shared before the user first connects to the group. The shared key(s) may be maintained and provided in a setting in each access point for example if the access points of the group are distributed and used by the same company. However, the shared key(s) may also be shared by utilizing an existing wired or wireless communication channel for example a wireless distribution system or a universal repeater set up between each of the access points in a secure manner. Each time a new access point joins the group, the shared key(s) may then be transferred to the joining access point. Furthermore, the shared key(s) may have a lifetime. After expiring of the lifetime, the shared key(s) may be replaced by new key(s).

With respect to FIG. 6, a first exemplary device 500 for implementing at the supplicant (user) side the above described methods will now be explained. The device 500 may for example include a chip having appropriate firmware or software. The device 500 includes a first circuit 502 configured to provide a master key such as the master key pair described above. A controller 504 is provided in the device 500 to determine whether a first mode according to the first authentication described above or a second mode corresponding to the second authentication described above is used for generating the master key. The controller is thereby configured to control the first circuit to extract the master key in the first mode from an EAP (Extensible Authentication Protocol) message received from the remote device (for example the first access point which is the authenticator for the first authentication). As described above, the master key has in the first mode been generated by utilizing the authentication server. Furthermore, the controller is configured to control the first circuit to generate a master key in the second mode based on a first Nonce extracted from a message received from a remote device (for example the second access point which is the authenticator for the second authentication) and a second Nonce created by the first circuit. As described above, the message from which the first Nonce is extracted may be message 1 of the handshake described with respect to FIG. 5e.

A further embodiment of a device 600 implementing the above described methods at the authenticator (access node) side will now be described with respect to FIG. 7.

Figure 7:
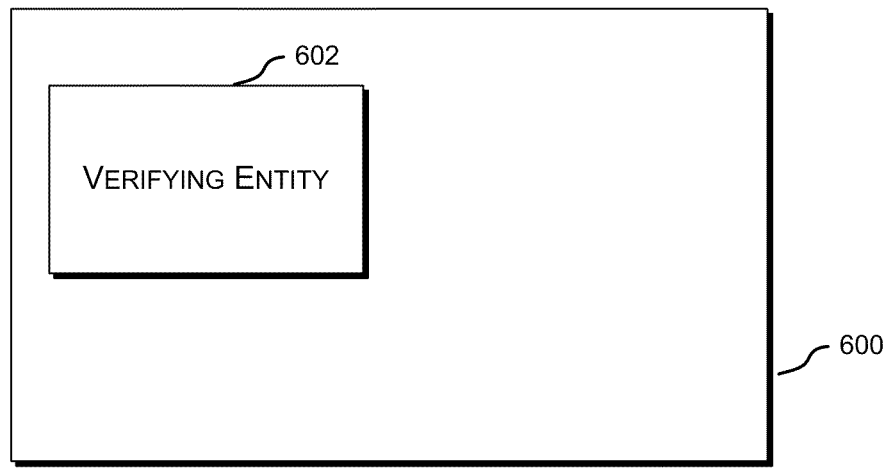

In FIG. 7 the device 600 comprises a first entity 602 which may for example be implemented in a chip as a circuit or a hardware using firmware or software. The first entity 602 is configured to receive from a user the first information which is generated based on privacy information of the user and predetermined information. As outlined above, in embodiments the first information is a secret key only known to the user seeking authentication. The first entity may further be configured to authenticate the user by applying the predetermined information to the first information. Applying the predetermined information may for example include the decryption processes to the Badge using the shared keys K and K' as outlined in the above with respect to FIGS. 5d and 5e.

Figure 6:
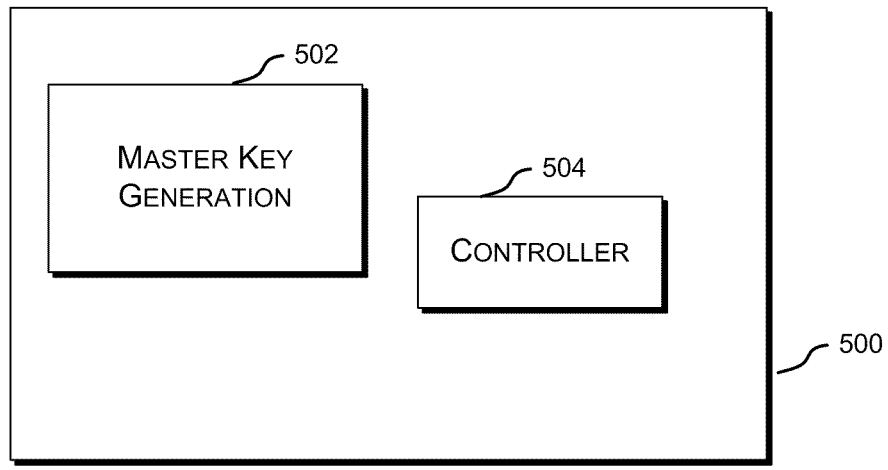
FIG. 6 and FIG. 7 show a first exemplary device for implementing the above described flow at the supplicant (user) side and a further embodiment of a device implementing the above described flow at the authenticator (access node) side, respectively.

While FIGS. 6 and 7 show only one of many implementations, it is to be understood that the devices 500 and 600 may also incorporate further features and functions as described above.

In the above description, embodiments have been shown and described herein enabling those skilled in the art in sufficient detail to practice the teachings disclosed herein. Other embodiments may be utilized and derived there from, such that structural and logical substitutions and changes may be made without departing from the scope of this disclosure.

This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation such as an analog signal representation, a digital signal representation, a modulation onto carrier signals etc. The term "information" may in addition to any form of digital information also include other forms of representing information. The term "entity" may in embodiments include any device, apparatus circuits, hardware, software, firmware, chips or other semiconductors as well as logical units or physical implementations of protocol layers etc. Furthermore the terms "coupled" or "connected" may be interpreted in a broad sense not only covering direct but also indirect coupling.

It is further to be noted that embodiments described in combination with specific entities may in addition to an implementation in these entity also include one or more implementations in one or more sub-entities or sub-divisions of said described entity. For example, specific embodiments described herein described herein to be implemented in a transmitter, receiver or transceiver may be implemented in sub-entities such as a chip or a circuit or in parts of a chip or circuits.

The accompanying drawings that form a part hereof show by way of illustration, and not of limitation, specific embodiments in which the subject matter may be practiced.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, where each claim may stand on its own as a separate embodiment. While each claim may stand on its own as a separate embodiment, it is to be noted that—although a dependent claim may refer in the claims to a specific combination with one or more other claims—other embodiments may also include a combination of the dependent claim with the subject matter of each other dependent claim.

It is further to be noted that methods disclosed in the specification or in the claims may be implemented by a device having means for performing each of the respective steps of these methods.

What is claimed is:

1. A method of authenticating a user in a communication network, comprising:
contacting an authentication entity in a first authentication of a user seeking access to the communication network;
supplying to the user first information comprising a first sub-fraction and a second sub-fraction, the first and second sub-fractions of the first information each being separately generated based on privacy information of the user and shared information, the shared information being shared among all access nodes of a group of access nodes and including a first shared key and a second shared key, the first shared key to provide encryption for the first information while the second shared key is to provide integrity check or other trustiness checks of the first information, the group of access nodes including at least a first access node and a second access node; and verifying the privacy information in a second authentication of the user by applying the second shared key to the second sub-fraction of the first information to provide the integrity check or the other trustiness checks.

2. The method according to claim 1, wherein the first authentication of the user is performed when the user seeks to connect to the communication network at the first access node and wherein the second authentication is performed when the user seeks to connect to the communication network at the second access node.

3. The method according to claim 1, further comprising: transferring the privacy information from the user to the second access node during a hand-off of the user from the first access node to the second access node; and authenticating the user for the second access node based on the verifying of the privacy information.

4. The method according to claim 1, wherein the privacy information is a first key generated during the authenticating of the user and wherein generating the first information comprises encrypting at least the first key by using the first shared key.

5. The method according to claim 4, wherein generating the first information comprises encrypting the first key and a first identifier of the user.

6. The method according to claim 5, wherein verifying the privacy information comprises:
decrypting the first information by using the first shared key, thereby retrieving the first key and the first identifier;
decrypting with the retrieved first key second encoded information thereby retrieving a second identifier included in the second encoded information; and
verifying whether the first identifier retrieved from decrypting the first information matches the second identifier retrieved from the second encoded information.

7. The method according to claim 6, wherein the second encoded information is part of a message of a 4-way handshake protocol.

8. The method according to claim 6, wherein the second encoded information further includes at least one of the following:
a Nonce for generating a master key pair; and
a timestamp.

9. The method according to claim 1, wherein the privacy information is a part of a transient key pair.

10. The method according to claim 1, further comprising:
generating a new first information, the newly generated first information being different than a previous the first information; and
transferring the newly generated first information to the user, the method further comprising:
verifying the user based on the newly generated first information.

11. The method according to claim 1, further comprising:
generating a master key pair when the first information is verified;
generating a transient key pair based on the master key pair;
newly generating the privacy information based on the transient key pair;
newly generating the first information based on the newly generated privacy information and the shared information;
transferring the newly generated first information to the user;
authenticating the user based on the newly generated information by verifying the newly generated information.

12. The method according to claim 1, wherein the first information is generated by using a secret key and wherein in the second authentication the secret key is retrieved from the first information by decrypting the first information using the shared information.

13. The method according to claim 12, further comprising using the retrieved secret key in the second authentication mode to decrypt further information transmitted from the user.

14. The method according to claim 13, wherein the further information from the user comprises an identifier of the user.

15. The method according to claim 1, wherein the verifying of the privacy information indicates to the access node that the user has been authenticated by the first authentication.

16. A communication system, comprising:
a first access node; and
a second access node;
wherein the first access node is configured to provide a first authentication to a user, the first authentication being based on utilizing an authentication entity;
the first access node being further configured to supply to the user first information comprising a first sub-fraction and a second sub-fraction, the first sub-fraction and the second sub-fraction of the first information each being separately generated based on privacy information of the user and shared information, the shared information being shared among at least the first access node and the second access node of the communication system and including a first shared key and a second shared key, the first shared key to provide encryption for the first information while the second shared key is to provide integrity check or other trustiness checks of the first information; and
wherein the second access node is configured to authenticate the user in a second authentication, the second access node comprising an entity to verify the first information based on applying the second shared key to the second sub-fraction of the first information to provide the integrity check or the other trustiness checks.

* * * * *